(12) United States Patent
Newstadt et al.

(10) Patent No.: US 9,218,495 B1
(45) Date of Patent: Dec. 22, 2015

(54) SYSTEMS AND METHODS FOR SHARING LOGS OF A CHILD'S COMPUTER ACTIVITIES WITH A GUARDIAN OF THE CHILD

(75) Inventors: Keith Newstadt, Newton, MA (US); Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 1260 days.

(21) Appl. No.: 12/491,374

(22) Filed: Jun. 25, 2009

(51) Int. Cl.
*G06F 17/00* (2006.01)
*G06F 17/30* (2006.01)
*G06F 21/62* (2013.01)
*G06F 7/00* (2006.01)

(52) U.S. Cl.
CPC ............ *G06F 21/62* (2013.01); *G06F 21/6218* (2013.01)

(58) Field of Classification Search
CPC .............................. G06F 21/62; G06F 21/6218
USPC .................... 707/781, 783, 999.001–999.005
See application file for complete search history.

(56) References Cited

U.S. PATENT DOCUMENTS

| | | | |
|---|---|---|---|
| 6,397,256 B1 * | 5/2002 | Chan et al. .................... 709/229 |
| 6,446,119 B1 * | 9/2002 | Olah et al. .................... 709/224 |
| 6,745,367 B1 * | 6/2004 | Bates et al. .................... 715/205 |
| 6,978,304 B2 * | 12/2005 | Fertell et al. .................. 709/224 |
| 7,046,139 B2 * | 5/2006 | Kuhn et al. ............... 340/539.15 |
| 7,640,336 B1 * | 12/2009 | Lu et al. ........................ 709/224 |
| 2001/0056350 A1 * | 12/2001 | Calderone et al. ............ 704/270 |
| 2004/0003071 A1 * | 1/2004 | Mathew et al. ............... 709/223 |
| 2004/0085207 A1 * | 5/2004 | Kreiner et al. ............. 340/572.1 |
| 2004/0221303 A1 * | 11/2004 | Sie et al. .......................... 725/29 |
| 2005/0153759 A1 * | 7/2005 | Varley ................................ 463/1 |
| 2005/0228881 A1 * | 10/2005 | Reasor et al. ................. 709/224 |
| 2006/0218575 A1 * | 9/2006 | Blair ............................... 725/28 |
| 2007/0079136 A1 * | 4/2007 | Vishik et al. .................. 713/186 |
| 2007/0202870 A1 * | 8/2007 | Bian et al. ..................... 455/428 |
| 2007/0282623 A1 * | 12/2007 | Dattorro .......................... 705/1 |
| 2008/0119201 A1 * | 5/2008 | Kolber et al. .............. 455/456.1 |
| 2008/0172746 A1 * | 7/2008 | Lotter et al. .................... 726/26 |
| 2009/0217342 A1 * | 8/2009 | Nadler .............................. 726/1 |
| 2011/0099621 A1 * | 4/2011 | Lizarraga et al. ............... 726/13 |

* cited by examiner

*Primary Examiner* — Kannan Shanmugasundaram
(74) *Attorney, Agent, or Firm* — ALG Intellectual Property, LLC

(57) ABSTRACT

A computer-implemented method for sharing logs of a child's computer activities with a guardian of the child is disclosed. The method may include determining that a child may be involved in a computer activity on a computing device that is not controlled by a guardian of the child, monitoring the computer activity, creating a log of the computer activity, determining that the guardian of the child is authorized to view the log of the computer activity, and providing the log of the computer activity to the guardian of the child. Various other methods, systems, and computer-readable media are also disclosed.

20 Claims, 7 Drawing Sheets

SYSTEMS AND METHODS FOR SHARING LOGS OF A CHILD'S COMPUTER ACTIVITIES WITH A GUARDIAN OF THE CHILD

BACKGROUND

Today, the average child may spend a significant amount of time involved in various online activities, such as emailing, instant messaging, browsing the Internet, and connecting with friends using social networks. Many parents understand the dangers associated with using the Internet and many have rules in place to protect their children. Parents often use conventional parental-control software programs to enforce these rules and to monitor their children's online activities.

Children may often participate in online activities away from their parents' supervision. For example, children may use computing devices that are not controlled by their parents, often at a friend's home. In such cases, a child's online activities may still be monitored by parental-control software controlled by the friend's parents; however, the child's parents typically have no way of accessing the logs of these online activities. What is needed, therefore, is a way for parents to share activity logs when appropriate.

SUMMARY

As will be described in greater detail below, the instant disclosure generally relates to systems and methods for sharing logs of a child's computer activities with a guardian of the child. According to certain embodiments, a computer-implemented method for sharing logs of a child's computer activities with a guardian of the child may include determining that the child may be involved in a computer activity on a computing device that is not controlled by the guardian of the child, monitoring the computer activity, creating a log of the computer activity, determining that the guardian of the child is authorized to view the log of the computer activity, and providing the log of the computer activity to the guardian of the child.

In certain embodiments, the computing device may be controlled by a guardian of a friend of the child. According to various embodiments, the method may include receiving a request to create a log-sharing policy that authorizes the guardian of the child to view the log of the computer activity of the child. The method may also include storing the log-sharing policy and determining that the guardian of the child is authorized to view the log of the computer activity by identifying the log-sharing policy.

In some embodiments, the method may include identifying a set of logs that includes the log of the child's computer activity, using the log-sharing policy to identify the log of the child's computer activity within the set of logs, and extracting the log of the child's computer activity from the set of logs. The log-sharing policy may identify an online account of the child and may indicate that the guardian of the child is authorized to view logs of computer activity associated with the online account of the child. In at least one embodiment, the log-sharing policy may identify a time period and may indicate that the guardian of the child is authorized to view logs of computer activity that occurs during the time period.

In various embodiments, determining that the child may be involved in the computer activity may include determining that the child may be in proximity of the computing device. In at least one embodiment, determining that the child may be in proximity of the computing device may include identifying a person in proximity of the computing device and determining that the person in proximity of the computing device is the child. The method may also include monitoring the computer activity by associating the child with the log of the child's computer activity. In some embodiments, a log-sharing policy may indicate that the guardian of the child is authorized to view computer-activity logs that are associated with the child.

According to certain embodiments, the method may include determining that the person in proximity of the computing device is the child by using face-recognition technology to identify the child, by using radio-frequency-identification technology to identify the child, and/or by using speaker-recognition technology to identify the child. In certain embodiments, at least one of the steps of the computer-implemented method may be performed in a cloud-computing environment. In various embodiments, at least one of the steps of the computer-implemented method may be performed by parental-control software on the computing device.

In some embodiments, the method may include providing the log of the computer activity to the guardian of the child by formatting the log in a format readable by parental-control software different than the parental-control software on the computing device. In certain embodiments, the method may include receiving a request to provide the log of the computer activity to the guardian of the child. In at least one embodiment, the method may include monitoring the computer activity before determining that the child may be involved in the computer activity.

According to certain embodiments, a system for sharing logs of a child's computer activities with a guardian of the child may include an identification module programmed to determine that the child may be involved in a computer activity on a computing device that is not controlled by the guardian of the child, a monitoring module programmed to monitor the computer activity and create a log of the computer activity, and a graphical user interface configured to receive a request to create a log-sharing policy that authorizes the guardian of the child to view the log of the computer activity of the child. The system may also include one or more databases configured to store the log of the computer activity and the log-sharing policy.

The system may further include a log-sharing module in communication with the one or more databases and programmed to identify the log-sharing policy, determine that the guardian of the child is authorized to view the log of the computer activity based on the log-sharing policy, and provide the log of the computer activity to the guardian of the child. The system may also include one or more processors configured to execute the identification module, the monitoring module, and the log-sharing module.

In certain embodiments, the log-sharing module may be programmed to provide the log of the computer activity to the guardian of the child by identifying a set of logs that comprises the log of the child's computer activity, using the log-sharing policy to identify the log of the child's computer activity within the set of logs, and extracting the log of the child's computer activity from the set of logs.

According to various embodiments, the identification module may further be programmed to determine that the child may be involved in the computer activity by determining that the child may be in proximity of the computing device, and the monitoring module may further be programmed to monitor the computer activity by associating the child with the log of the child's computer activity. In some embodiments, the system may also include an identification device in communication with the identification module and configured to determine that the child may be in proximity of the computing device by identifying a person in proximity of the computing device and by determining that the person in proximity of the computing device is the child. In various embodiments, the identification device may comprise an audio-capturing device, a video-capturing device, an image-capturing device, and/or a radio-frequency-identification receiver.

According to certain embodiments, a computer-readable-storage medium may include one or more computer-executable instructions that, when executed by at least one processor of a computing device, cause the computing device to: 1) determine that a child may be involved in a computer activity on a computing system that is not controlled by a guardian of the child, 2) monitor the computer activity, 3) create a log of the computer activity, 4) determine that the guardian of the child is authorized to view the log of the computer activity, and 5) provide the log of the computer activity to the guardian of the child.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
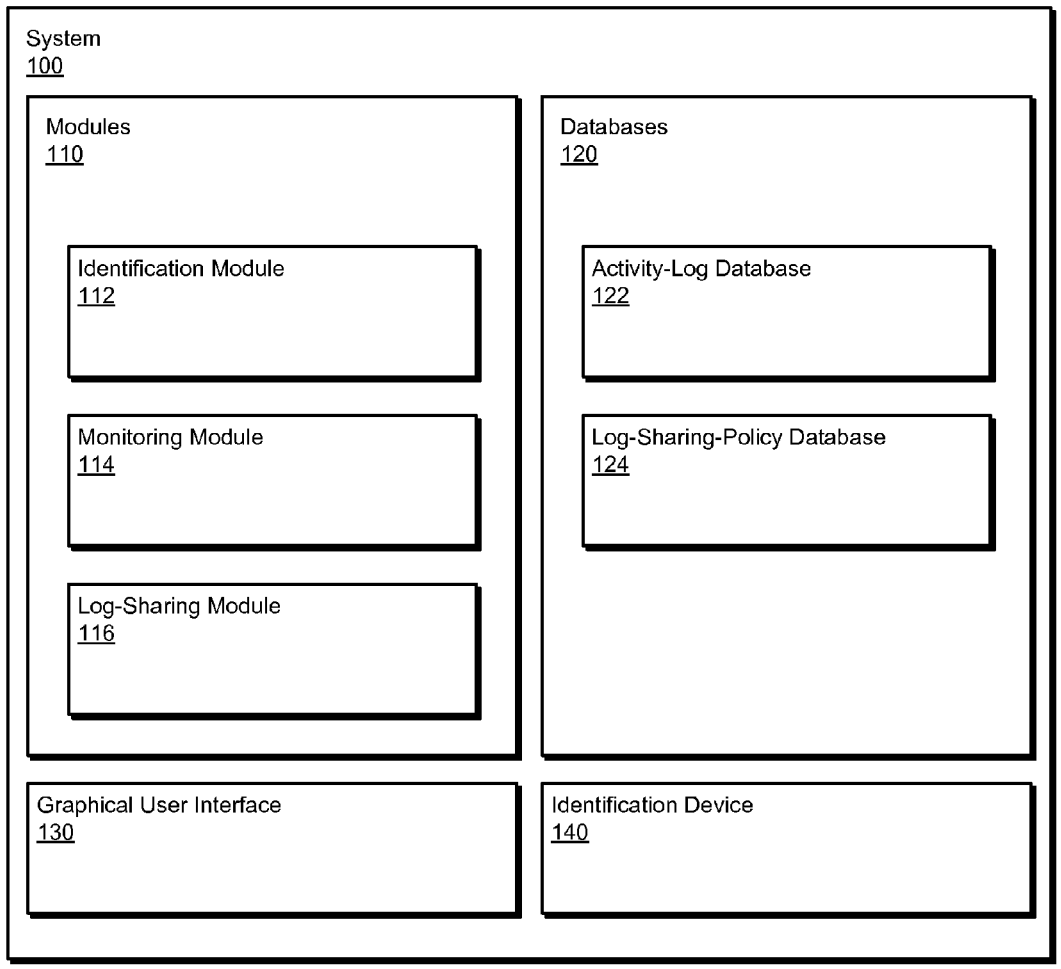
FIG. 1 is a block diagram of an exemplary system for sharing logs of a child's computer activities with a guardian of the child.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure presents various methods and systems for sharing logs of a child's computer activities with a guardian of the child. Embodiments of this disclosure may allow the guardian of the child to monitor computer activity on a computing device that they do not control. For example, an identification module may determine that the child may be involved in a computer activity (such as surfing the web, chatting with friends, or updating social-networking sites) on a computing device that is not controlled by the guardian of the child (e.g., a friend's computer controlled by the friend's parents). A monitoring module may monitor the computer activity and create a log of the computer activity. After determining that a guardian of the child is authorized to view the log of the child's computer activities, a log-sharing module may provide the log of the activities to the guardian. As used herein, the terms "guardian" and "parent" refer to any individual responsible for and/or interested in monitoring a child's computer activities.

In certain embodiments, the log-sharing module may use a log-sharing policy to determine the circumstances in which logs may be provided to the guardian of the child. The log-sharing policy may be account-based (e.g., identifying logs using account-authentication information, such as a username or email address), time-based (e.g., identifying logs based on when a computer activity occurred), and/or recognition-based (e.g., identifying logs that are associated with the child using a recognition technology, such as face-recognition or radio-frequency identification technologies).

Figure 2:
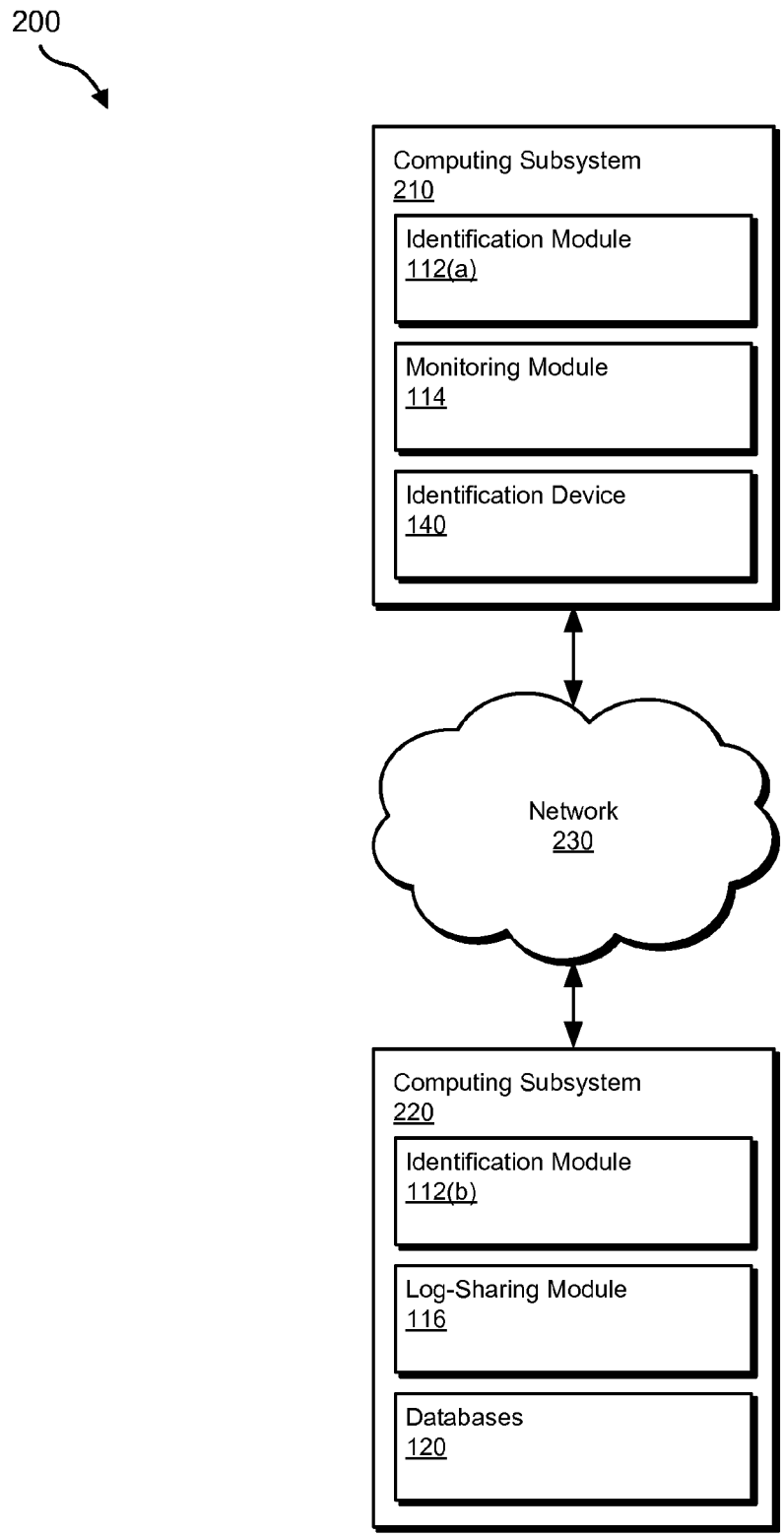
FIG. 2 is a block diagram of another exemplary system for sharing logs of a child's computer activities with a guardian of the child.
Figure 3:
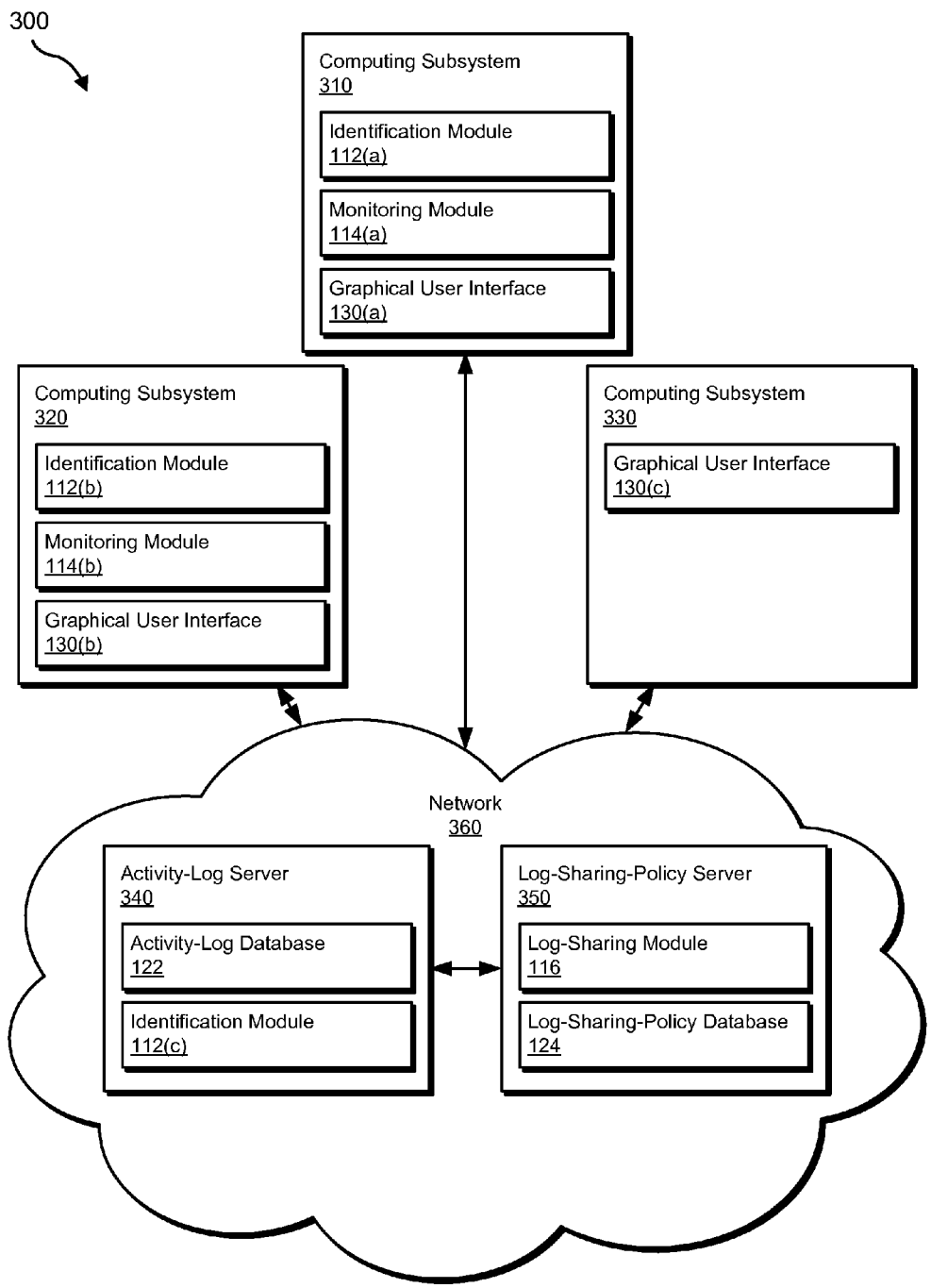
FIG. 3 is a block diagram of another exemplary system for sharing logs of a child's computer activities with a guardian of the child.

The following will provide, with reference to FIGS. 1-3, detailed descriptions of exemplary systems for sharing logs of a child's computer activities with a guardian of the child. Detailed descriptions of corresponding computer-implemented methods will also be provided in connection with FIGS. 4 and 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for sharing logs of a child's computer activities with a guardian of the child. Exemplary system 100 may include one or more modules 110 for performing one or more tasks. As illustrated in FIG. 1, modules 110 may include an identification module 112, a monitoring module 114, and a log-sharing module 116. Identification module 112 may be programmed to determine that a child may be involved in a computer activity on a computing device that is not controlled by a guardian of the child, and monitoring module 114 may be programmed to monitor and create a log of the computer activity. Log-sharing module 116 may be programmed to: 1) identify a log-sharing policy, 2) determine that the guardian of the child is authorized to view the log of the computer activity based on the log-sharing policy, and then 3) provide the log of the computer activity to the guardian of the child. Although illustrated as separate elements, one or more of modules 110 in FIG. 1 may represent portions of a single module or application.

In certain embodiments, one or more of modules 110 in FIG. 1 may represent one or more software applications or programs (e.g., parental-control software) that, when executed by a computing device, may cause the computing device to perform one or more tasks. For example, as will be described in greater detail below, one or more of modules 110 may represent software modules stored and configured to run on one or more computing devices, such as the devices illustrated in FIG. 2 (i.e., computing subsystem 210 and/or computing subsystem 220), the devices illustrated in FIG. 3 (i.e., computing subsystem 310, computing subsystem 320, computing subsystem 330, activity-log server 340, and/or log-sharing-policy server 350), computing system 610 in FIG. 6, and/or portions of exemplary network architecture 700 in FIG. 7. One or more of modules 110 in FIG. 1 may also represent all or portions of one or more special-purpose computers configured to perform one or more tasks.

As illustrated in FIG. 1, exemplary system 100 may also include one or more databases 120. Databases 120 may represent portions of a single database or computing device or a plurality of databases or computing devices. As shown, databases 120 may include an activity-log database 122 for storing computer-activity logs and a log-sharing-policy database 124 for storing log-sharing policies.

Databases 120 in FIG. 1 may represent a portion of one or more computing devices. For example, databases 120 may represent a portion of computing subsystem 220 in FIG. 2, activity-log server 340 and log-sharing-policy server 350 in FIG. 3, computing system 610 in FIG. 6, and/or portions of exemplary network architecture 700 in FIG. 7. Alternatively, databases 120 in FIG. 1 may represent one or more physically separate devices capable of being accessed by a computing device, such as computing subsystem 220 in FIG. 2, activity-log server 340 and log-sharing-policy server 350 in FIG. 3, computing system 610 in FIG. 6, and/or portions of exemplary network architecture 700 in FIG. 7. Although not illustrated, in certain embodiments a portion of databases 120 may also be stored on computing subsystem 210 in FIG. 2 and/or one or more of computing subsystems 310, 320, and 330 in FIG. 3.

In addition to modules 110 and databases 120, exemplary system 100 may also include a graphical user interface 130 configured to receive a request to create a log-sharing policy that authorizes the guardian of the child to view the log of the computer activity of the child. Graphical user interface 130 may also be configured to display logs.

System 100 may also include an identification device 140 in communication with identification module 112 and configured to determine that the child may be in proximity of the computing device. Examples of identification device 140 include, without limitation, an audio-capturing device (e.g., a microphone), a video-capturing device (e.g., a webcam or video camera), an image-capturing device (e.g., a webcam or digital camera), and/or a radio-frequency identification ("RFID") receiver.

In one embodiment, all or a portion of system 100 may be configured to run on the same physical computing device. For example, all or a portion of system 100 may comprise parental-control software and may be configured to run on a computing device that is not controlled by a guardian of a child.

In some embodiments, all or a portion of exemplary system 100 may represent portions of network-based system 200 illustrated in FIG. 2. FIG. 2 is a block diagram of an exemplary system 200 for sharing logs of a child's computer activities with a guardian of the child. As illustrated in this figure, exemplary system 200 may include a computing subsystem 210 in communication with a computing subsystem 220 via a network 230.

Computing subsystem 210 generally represents any type or form of computing device capable of reading computer-executable instructions. Examples of computing subsystem 210 include, without limitation, laptops, desktops, servers, cellular phones, smart phones, personal digital assistants ("PDAs"), multimedia players, game consoles, embedded systems, combinations of one or more of the same, exemplary computing system 610 in FIG. 6, or any other suitable computing device. For example, computing subsystem 210 may represent a computing device not controlled by the guardian of the child.

In certain embodiments, computing subsystem 220 may represent any type or form of computing device that is capable of providing activity-log-sharing services. Examples of computing subsystem 220 include, without limitation, various types of computing devices (e.g., those listed for computing subsystem 210), application servers configured to run certain software applications, and/or database servers configured to provide various database services.

Network 230 generally represents any medium or architecture capable of facilitating communication or data transfer. Examples of network 230 include, without limitation, an intranet, a wide area network ("WAN"), a local area network ("LAN"), a personal area network ("PAN"), the Internet, power line communications ("PLC"), a cellular network (e.g., a GSM Network), exemplary network architecture 700 in FIG. 7, or the like. Network 230 may facilitate communication or data transfer using wireless and/or wired connections. In one embodiment, network 230 may facilitate communication between computing subsystem 210 and computing subsystem 220.

As shown in FIG. 2, computing subsystem 210 may include an identification module 112(a), log-sharing module 116(a), monitoring module 114, and identification module 140. Identification module 112(a) may determine that a child may be involved in a computer activity on computing subsystem 210 (i.e., a computing device not controlled by a guardian of the child), and monitoring module 114 may monitor and create a log of the computer activity. Log-sharing module 116(a) may determine that the parents are authorized to view the log of the computer activity and may send the log of the computer activity to computing subsystem 220 to provide the log of the computer activity to a guardian of the child.

In some embodiments, identification module 112(b) (i.e., an identification module on the guardian's computing device), rather than identification module 112(a), may determine whether the child was involved in a computer activity on computing subsystem 210. In such embodiments, monitoring module 114 may still monitor and create a log of the computer activity and may send the log to computing subsystem 220. At a later time, log-sharing module 116(a) may determine that the child was involved in the computer activity may extract the log of the child's computer activity from the set of logs. Log-sharing module 116(a) may then provide the log to the guardian of the child.

As mentioned previously, exemplary system 100 in FIG. 1 may be configured in a variety of ways. For example, all or a portion of exemplary system 100 may represent portions of cloud-based system 300 illustrated in FIG. 3. FIG. 3 is a block diagram of an exemplary cloud-based system 300 for sharing logs of a child's computer activities with a guardian of the child. As illustrated in this figure, exemplary system 300 may include a computing subsystem 310, a computing subsystem 320, and a computing subsystem 330, all connected to a cloud-based network 360 that may include one or more servers. As illustrated, network 360 may include an activity-log server 340 and a log-sharing-policy server 350.

Computing subsystems 310, 320, and 330 generally represent any type or form of computing device capable of reading computer-executable instructions. Examples of computing subsystems 310, 320, and 330 include, without limitation, laptops, desktops, servers, cellular phones, smart phones, personal digital assistants ("PDAs"), multimedia players, game consoles, embedded systems, combinations of one or more of the same, exemplary computing system 610 in FIG. 6, or any other suitable computing device.

Activity-log server 340 and log-sharing server 350 may represent any type or form of computing devices that are capable of providing activity-log-sharing services to any Internet-connected computing device. Examples of activity-log server 340 and log-sharing server 350 include, without limitation, application servers and database servers configured to provide various database services and/or run certain software applications.

Network 360 may represent a cloud-computing environment capable of performing at least one of the steps disclosed herein. As used herein, a cloud-computing environment or "cloud" may refer to a scalable collection of network accessible hardware and/or software resources. Cloud computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The following is an example of how system 300 may allow parents to share logs of a child's computer activities. In this example, computing subsystems 310, 320, and 330 may represent a child's friend's computer, the child's computer, and the child's parent's computer, respectively. Computing subsystems 310 and 320 may both include the same parental-control software comprising an identification module, a monitoring module, and a graphical user interface. In this example, all logs of computer activities occurring on computing subsystems 310 and 320 are stored in activity-log database 122 located on activity-log server 340. The child's parents control the child's computer and can access logs of computer activities that occur on computing subsystem 320 by using graphical user interface 130(b) or graphical user interface 130(c) to connect to activity-log server 340. Likewise, the child's friend's parents control the child's friend's computer and can access logs of computer activities that occur on computing subsystem 310 by using graphical user interface 130(a) to connect to activity-log server 340. Log-sharing module 116 may allow the parents of the child and the parents of the friend to share logs of computer activities that occur on the computing devices they control.

To illustrate, identification module 112(a) may determine that the child may be involved in a computer activity on computing subsystem 310, and monitoring module 114(a) may monitor and create a log of the computer activity. Monitoring module 114(a) may send the log to activity-log server 340 to be stored in activity-log database 122. The parents of the friend may use graphical user interface 130(a) (e.g., a web browser) to connect to log-sharing module 116 in order to provide permission to the parents of the child to view the log of the computer activity. A parent of the child may use graphical user interface 130(c) located on computing subsystem 330 to request the log from log-sharing-policy server 350. Log-sharing module 116 may determine that the parent of the child is authorized to view the log of the computer activity by checking the log-sharing policy and may provide the log of the computer activity to the parent of the child through graphical user interface 130(c).

Figure 4:
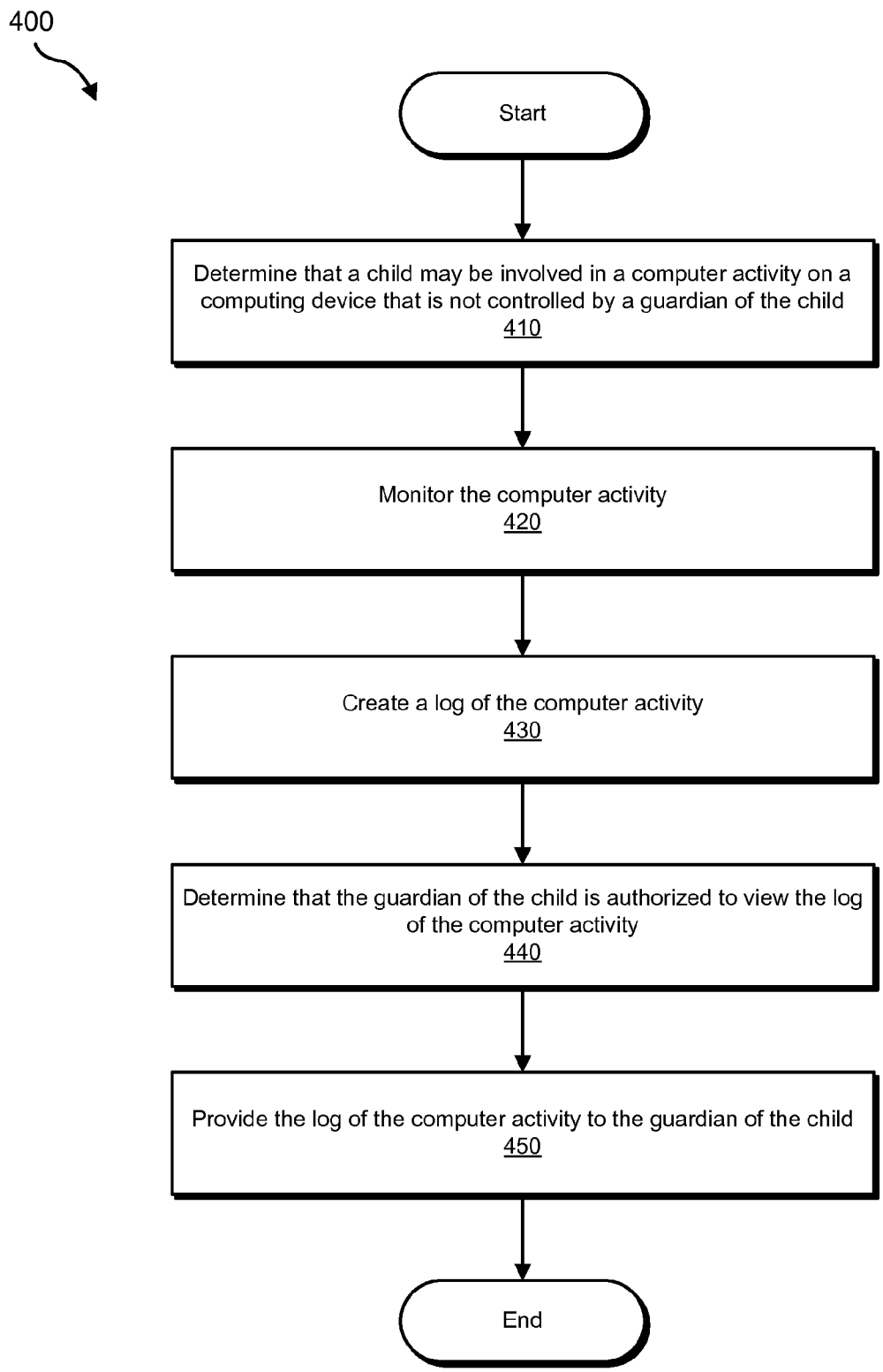
FIG. 4 is a flow diagram of an exemplary method for sharing logs of a child's computer activities with a guardian of the child.

FIG. 4 is a flow diagram of an exemplary computer-implemented method 400 for sharing logs of a child's computer activities with a guardian of the child. The steps shown in FIG. 4 may be performed by any suitable computer-executable code and/or computing system. In some embodiments, the steps shown in FIG. 4 may be performed by one or more of the components of system 100 in FIG. 1, one or more of the subsystems of system 200 in FIG. 2, and/or one or more of the elements of system 300 in FIG. 3, as will be explained in greater detail below.

At step 410 in FIG. 4, the system may determine that a child may be involved in a computer activity on a computing device that is not controlled by a guardian of the child. For example, identification module 112(a) may determine that a child may be involved in a computer activity on computing subsystem 210 of FIG. 2, which is not controlled by a parent of the child. Identification module 112(a) may determine that the child may be involved in the computer activity in a variety of ways. For example, identification module 112(a) may determine that the child is involved in the computer activity using account information of the child (e.g., a username), a time period (e.g., a time period when the child was at a friend's home), recognition technologies (e.g., face recognition), or in any other way.

As noted, identification module 112(a) may use account information of the child to determine that the child may be involved in the computer activity. For example, identification module 112(a) may determine that an online account associated with the child was accessed as part of the computer activity. Identification module 112(a) may determine that an online account associated with the child was accessed as part of the computer activity by identifying usernames (used, for example, by social-networking sites, message boards, and the like), handles (used, for example, by instant-messaging services), local portions of e-mail addresses (i.e., the portion of the email address that precedes the domain-name portion of the email address), web addresses of sites visited, and/or any other suitable account-identification information.

Additionally or alternatively, identification module 112(a) may determine that the child may be in proximity of the computing device by identifying a time period that the child may be in proximity of the computing device. For example, if the child is at the friend's house from 6-9 in the evening, the guardian of the child may request activity logged on the friend's computer during this time period. A guardian of the friend may create a policy that allows the child's guardian to view logs created during the requested time period, and the logs may then be provided to the guardian of the child.

In certain embodiments, identification module 112(a) may determine that the child may be involved in the computer activity by determining that the child is or may be in proximity of the computing device. In one embodiment, identification module 112(a) may determine that the child may be in proximity of the computing device by: 1) identifying a person in proximity of the computing device, 2) determining that the person in proximity of the computing device is the child, and then 3) associating the child with the log of the child's computer activity.

In some embodiments, identification module 112(a) may use one or more recognition technologies to determine that the child is in proximity of the computing device. For example, in some embodiments, identification module 112(a) may determine that the person in proximity of the computing device is the child by using face-recognition technology (e.g., identifying the child in a video or still image using the child's facial features), using radio-frequency-identification technology (e.g., identifying an RFID tag attached to the child's clothing, affixed to an item the child carries, or otherwise associated with the child), and/or using speaker-recognition technology (e.g., identifying the child's voice using a microphone) to identify the child. Identification module 112(a) may also determine that the child may be involved in a computer activity using a global positioning system ("GPS"), hybrid positioning systems (e.g., cell tower triangulation or Wi-Fi positioning), or any other technology capable of identifying the child and/or the child's location.

In certain embodiments, a remote identification module may determine that the child may be involved in the computer activity. In one example, the child may use a friend's computer (e.g., computing subsystem 210 of FIG. 2) to browse the Internet. Identification module 112(*a*), located on computing subsystem 210, may partially determine that the child is involved in a computer activity by capturing a photo of the child using identification device 140 (e.g., a webcam). Identification module 112(*a*) may send the photo to identification module 112(*b*). Identification module 112(*b*) may identify the child in the photo and thereby determine that the child is involved in the computer activity.

The information used by identification modules 112(*a*) and 112(*b*) to determine that the child may be involved in the computer activity may come from the child's parents and/or the person controlling the computing device (e.g., a friend's parents). For example, the child's parents may be required to provide the information (e.g., the photo in the previous example) that enables identification module 112(*a*) to recognize or otherwise identify the child. In other embodiments, the information may be extracted from computer-activities logs already associated with the child. For example, identification module 112(*c*) may implement any suitable heuristic or algorithm to generate the information. To illustrate, as described previously, computing subsystems 310 and 320 may contain the same parental-control software, and the child's parents may use the parental-control software to monitor the child's computer activities on the child's computer (i.e., computing subsystem 320). In this example, all logs of computer activities occurring on computing subsystem 320 may be stored in activity-log database 122 located on activity-log server 340. Identification module 112(*c*) may use these logs of computer activities to identify information that may be used to determine computer activities of the child that may occur on other computing devices (e.g., computing subsystem 310). For example, identification module 112(*c*) may identify the child's account-authorization information (e.g., usernames and email addresses), a photo that may be used for face recognition, and/or any other information.

A child may be involved in a computer activity in a number of different ways. For example, a child may be involved in a computer activity when the child is actively interacting with the computer. Alternatively, a child may be involved in a computer activity when the child passively views computer activity (e.g., when a child watches a friend browse the internet, play a computer game, etc.). In some embodiments, identification module 112 may determine that a child may be involved in a computer activity on a computing device by determining that the child is probably involved in the computer activity. For example, identification module 112 may determine that the child is at the friend's house during a specific time period and may determine that the friend is using the computing device. Based on this information, identification module 112 may determine that the child is probably involved in the computer activity with the friend. In other embodiments, identification module 112 may determine that the child is participating in the computer activity with greater certainty. For example, if identification module 112 determines that an online account of the child was used on the computing device, then identification module 112 may determine that the child was involved in the computer activity on the computing device.

Returning to FIG. 4, at step 420 in FIG. 4 the system may monitor the computer activity. For example, monitoring module 114 may monitor the computer activity by identifying all information associated with the computer activity, by continually tracking the computer activity, and/or by collecting any other information about the computer activity. Examples of monitored information may include websites visited, account-authorization information, Internet searches, total time spent, files downloaded, keystrokes, chat sessions, email recipients and senders, incoming or outgoing communications, application names, metadata (e.g., name, rating, etc.) of digital media viewed or games played, information specifying when and where the computer activity took place, and/or any other relevant information. Additionally, monitoring module 114 may capture identification information from identification device 140.

Monitoring module 114 may monitor a variety of computer activities. Examples of computer activities may include, without limitation, chatting (e.g., instant messaging, text messaging), using email, browsing the Internet, updating social-networking sites, playing games, and/or viewing digital media (e.g., images, video, movies, music, etc.).

At step 430 in FIG. 4, the system may create a log of the computer activity. For example, monitoring module 114 may create a log of the computer activity by storing the log in a file or database locally, by sending the log to a server (e.g., activity-log server 340 in FIG. 3) to be stored as a file or in a database, and/or by storing the log using any other means. The log of the computer activity may include a record or timeline of the computer activity and may contain any of the monitored information obtained in step 420.

In certain situations, information used to determine that the child was involved in the computer activity may be unknown at the moment a computer activity occurs. Therefore, in at least one embodiment, monitoring module 114 may monitor the computer activity (i.e., step 420) and create the log of the computer activity (i.e., step 430) before the child is determined to be involved in the computer activity (i.e., step 410).

For example, identification module 112(*a*), located on computing subsystem 310, may determine that a person is involved in a computer activity on the computing device, and monitoring module 114 may monitor and log the computer activity according to steps 420 and 430. Then, a later point in time, identification module 112(*c*), located on activity-log server 340, may obtain and use additional information to identify the person as the child. The addition information may include a time period that the child may have been involved in the computer activity, account information, recognition information, location information, and/or any other information that may identify the child.

At step 440 in FIG. 4, the system may determine that the guardian of the child is authorized to view the log of the computer activity. For example, log-sharing module 116 may determine that the guardian of the child is authorized to view the log of the child's computer activity by identifying a log-sharing policy that authorizes the guardian of the child to view the log of the computer activity. In general, the person that controls the computing device on which the computer activity took place may need to agree to share the logs of the computer activity by granting the guardian of the child permission to view logs of the computer activity. Additional information concerning log-sharing policies, including the process in which log-sharing module 116 identifies a log-sharing policy, will be explained in greater detail in the discussion of steps 540-560 of FIG. 5.

At step 450 in FIG. 4, the system may provide the log of the computer activity to the guardian of the child. For example, after determining that the guardian of the child is authorized to view the log of the child's computer activity, log-sharing module 116 may provide the log to the guardian. Log-sharing module 116 may provide the log in a variety of ways. For example, log-sharing module 116 may provide the log as a file, in the form of an email or text message, through graphical interface 130, through a website hosted in the cloud, or in any other way. In various embodiments, log-sharing module 116 may provide a summary of logged information, a portion of logged information, or all logged information about the computer activity.

In one embodiment, the parents of the child may have parental-control software different than the parental-control software used on the computing device. In such instances, log-sharing module 116 may format the log in a format readable by the parent's parental-control software. Upon completion of step 450, exemplary method 400 in FIG. 4 may terminate.

Figure 5:
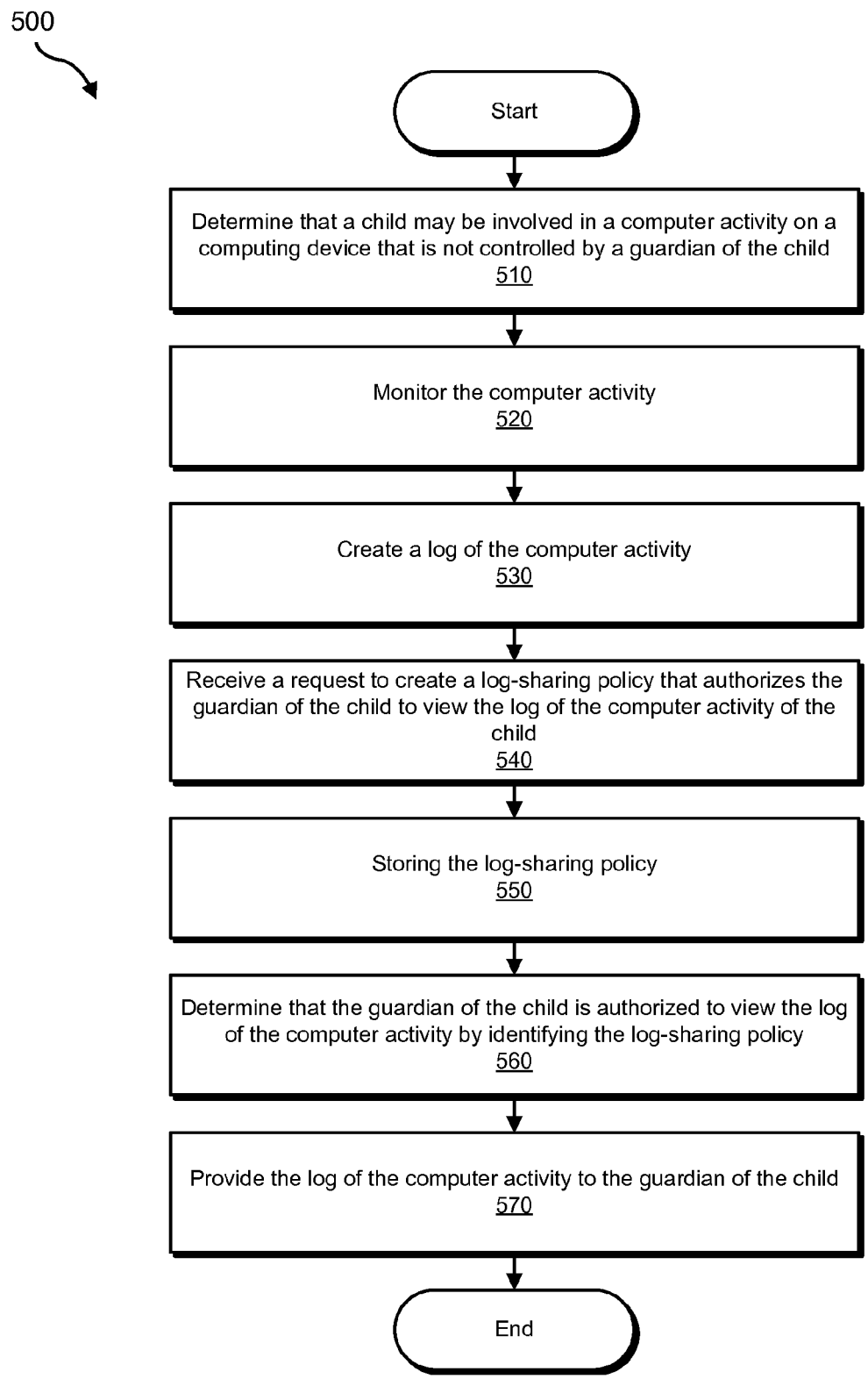
FIG. 5 is a flow diagram of another exemplary method for sharing logs of a child's computer activities with a guardian of the child.

FIG. 5 is a flow diagram of another exemplary computer-implemented method 500 for sharing logs of a child's computer activities with a guardian of the child. The steps shown in FIG. 5 may be performed by any suitable computer-executable code and/or computing system. In some embodiments, the steps shown in FIG. 5 may be performed by one or more of the components of system 100 in FIG. 1, one or more of the subsystems of system 200 in FIG. 2, and/or one or more of the subsystems of system 300 in FIG. 3, as will be explained in greater detail below.

At step 510 in FIG. 5 the system may determine that a child may be involved in a computer activity on a computing device that is not controlled by a guardian of the child, at step 520 the system may monitor the computer activity, and at step 530 the system may create a log of the computer activity. Steps 510, 520, and 530 are similar to steps 410, 420, and 430. Therefore, the discussions of steps 410, 420, and 430 may also apply to steps 510, 520, and 530.

For example, a child may be browsing the Internet at a friend's home using computing subsystem 310 of FIG. 3, which may be the child's friend's laptop computer. Identification module 112(a) may determine that the child is involved in browsing the Internet, and monitoring module 114(a) may monitor the child's browsing activities, associate the child with the browsing activities, and create and send a log of the browsing activities to activity-log server 340 of FIG. 3 to be stored in activity-log database 122.

At step 540 in FIG. 5 the system may receive a request to create a log-sharing policy that authorizes the guardian of the child to view the log of the computer activity of the child. For example, log-sharing module 116 may receive a request from the guardian of the child requesting permission to view logs of the child's computer activity, a policy from the person controlling the computing device permitting the guardian of the child to view the logs of computer activity, and/or any other request to create or modify a log-sharing policy.

For example, a parent of the child may use graphical user interface 130(c) located on computing subsystem 330 of FIG. 3 (the child's parent's computer) to send a request to log-sharing module 116 (located on log-sharing-policy server 350) requesting permission to view the logs of the child's browsing activities that occurred on the child's friend computer. After receiving the request through graphical user interface 130(c), log-sharing module 116 may then create the log-sharing policy. Log-sharing module 116 may also notify the parents of the friend of the request to view the log, after which, the parents of the friend may authorize the parents of the child to view the logs of the child's browsing activities.

A log-sharing policy may include any policy for sharing logs of computer activities. In general, a log-sharing policy includes information specifying what logs are to be shared, with whom they may be shared with, and whether permission to share the logs has been granted. In certain embodiments, the information specifying what logs may be shared may include the information used to determine that the child may be involved in the computer activity (i.e., the information used in steps 410 and 510).

In one embodiment, a log-sharing policy may identify an online account of the child and may indicate that the guardian of the child is authorized to view all logs of computer activity associated with the online account of the child. For example, a log-sharing policy may specify that all logs involving a child's social networking account may be shared with the parents of the child.

In additional embodiments, the log-sharing policy may identify a time period and may indicate that the guardian of the child is authorized to view any logs of computer activity that occur during that time period. The time period may be a past time period, a present time period, and/or a future time period. For example, a child may be planning to visit a friend between 3 p.m. and 5 p.m. The parents of the child may request that the parents of the friend share logs of any computer activity during that time period. Therefore, the log-sharing policy may specify that all logs of computer activity occurring between 3 p.m. and 5 p.m. may be shared with the parents of the child.

In other embodiments, the log-sharing policy may indicate that the guardian of the child is authorized to view computer-activity logs that are associated with the child. For example, in the case that the system determines that the child is involved in a computer activity (e.g., using face recognition or any other recognition technology), a log of the computer activity may contain information (e.g., the child's name or other identifier) specifying that the child was present. The log-sharing policy may then specify that all logs of computer activity associated with the child (e.g., that identify the child) may be shared with the parents of the child.

In certain embodiments, the log-sharing policy may specify that only past logs, present logs, future logs, or logs created during a specific time period may be viewed by the child's parents. For example, the log-sharing policy may only allow the child's parents to view logs of future computer activities that involve the child.

In at least one embodiment, receiving a request to create a log-sharing policy may include receiving a request to provide the log of the computer activity to the guardian of the child and/or may include a request to provide the log in a specific format. For example, the request may specify that the guardian of the child would like to receive the log as a file, as an email, as a file attached to an email, as a text message, over the Internet, directly to a computer, or in any other suitable form. Therefore, the log-sharing policy may indicate how to provide the log to the guardian of the child.

In various embodiments, log-sharing module 116 may receive the request before, after, or during the child's involvement in the computer activity, and the log-sharing policy may specify when to provide the log to the guardian of the child. For example, in the case that the log-sharing policy is created before the child's involvement, the log-sharing policy may specify that the guardian of the child wants to receive logs of computer activity immediately. The log-sharing policy may also specify a time interval for providing logs. For example, the log-sharing policy may specify that the logs should be provided once an hour, once a day, and/or once a week.

In certain embodiments, log-sharing module 116 may provide the parent of the child with a list of logs of computer activities that their child may have been involved in. The parent of the child may then use the list to request that a log-sharing policy be created and permission granted to view one or more of the logs contained in the list.

At step 550 in FIG. 5 the system may store the log-sharing policy. For example, log-sharing module 116 may store the log-sharing policy in a database (e.g., log-sharing-policy database 124), as a file, or using any other suitable storage mechanism. At step 560, the system may determine that the guardian of the child is authorized to view the log of the computer activity by identifying the log-sharing policy. For example, log-sharing module 116 may identify a log-sharing policy that authorizes the guardian of the child to view the log of the computer activity. Then, in certain embodiments, identification module 112(c) and/or log-sharing module 116 may identify a set of logs (in a database or file such as activity-log database 122) that comprises the log of the child's computer activity and may use the log-sharing policy to identify the log of the child's computer activity within the set of logs. Identification module 112(c) and/or log-sharing module 116 may then extract the log of the child's computer activity from the set of logs.

In one example, the child may have browsed the Internet with a friend. While browsing the Internet both the child's and the child's friend's social-networking accounts may have been updated. A log-sharing policy may authorize the guardian of the child to view logs of computer activity involving the child's social-networking account. Identification module 112 (c) may identify the log of the children's browsing and may extract only the portion of the log involving the child's social-networking account.

In various embodiments, the child's guardian may use graphical user interface 130(c) to request, from log-sharing module 116, a list of all logs that the guardian is authorized to view. To create the list, log-sharing module 116 may, as part of log-sharing-policy server 340, query log-sharing-policy database 124 for all policies related to the child's computer activity and that permit the guardian to view logs. The guardian may use the list to monitor their child's computer activities on the computing device and select logs to view.

At step 570, the system may provide the log of the computer activity to the guardian of the child. For example, log-sharing module 116 may provide the log of the computer activity to a parent of the child. Log-sharing module 116 may provide the log of the computer activity to the parent of the child by emailing the log to the parent, allowing the parent to view the log over the Internet, sending a portion of the log as a text message to the parent, and/or in any other way. For example, the parent of the child may use graphical user interface 130(c) on computing subsystem 330 (i.e., the parent's computer) to request a log from log-sharing module 116, and log-sharing module 116 may send the log of the computer activity to graphical user interface 130(c) to be displayed.

In at least one embodiment, log-sharing module 116 (as part of parental-control software on the computing device or as part of log-sharing server 350) may provide the log of the computer activity to the guardian of the child by formatting the log in a format readable by parental-control software different than the parental-control software on the computing device.

In certain embodiments, the system may perform steps 510-570 automatically based on an interval of time specified in a log-sharing policy. For example, if the log-sharing policy specifies that all computer activities of the child should be shared immediately, then as soon as a computer activity is logged and after the child is determined to be involved the system may provide the log to the guardian of the child. Similarly, if the log-sharing policy specifies that all computer activities of the child should be provided to the guardian of the child once a day, then the system may provide logs of any new computer activity to the guardian of the child once a day. Steps 560 and 570 are similar to steps 440 and 450. Therefore, the discussions of steps 440 and 450 may also apply to steps 560 and 570. Upon completion of step 570, exemplary method 500 in FIG. 5 may terminate.

As explained previously, by providing a means for sharing logs of a child's computer activities with a guardian of the child, the systems and methods described herein may allow a parent to monitor their child's online activities even when the child is using a computing device not controlled by the parent (e.g., when the child is at a friend's house, using a friend's laptop, or using any other computing device that is not controlled by the parent).

Figure 6:
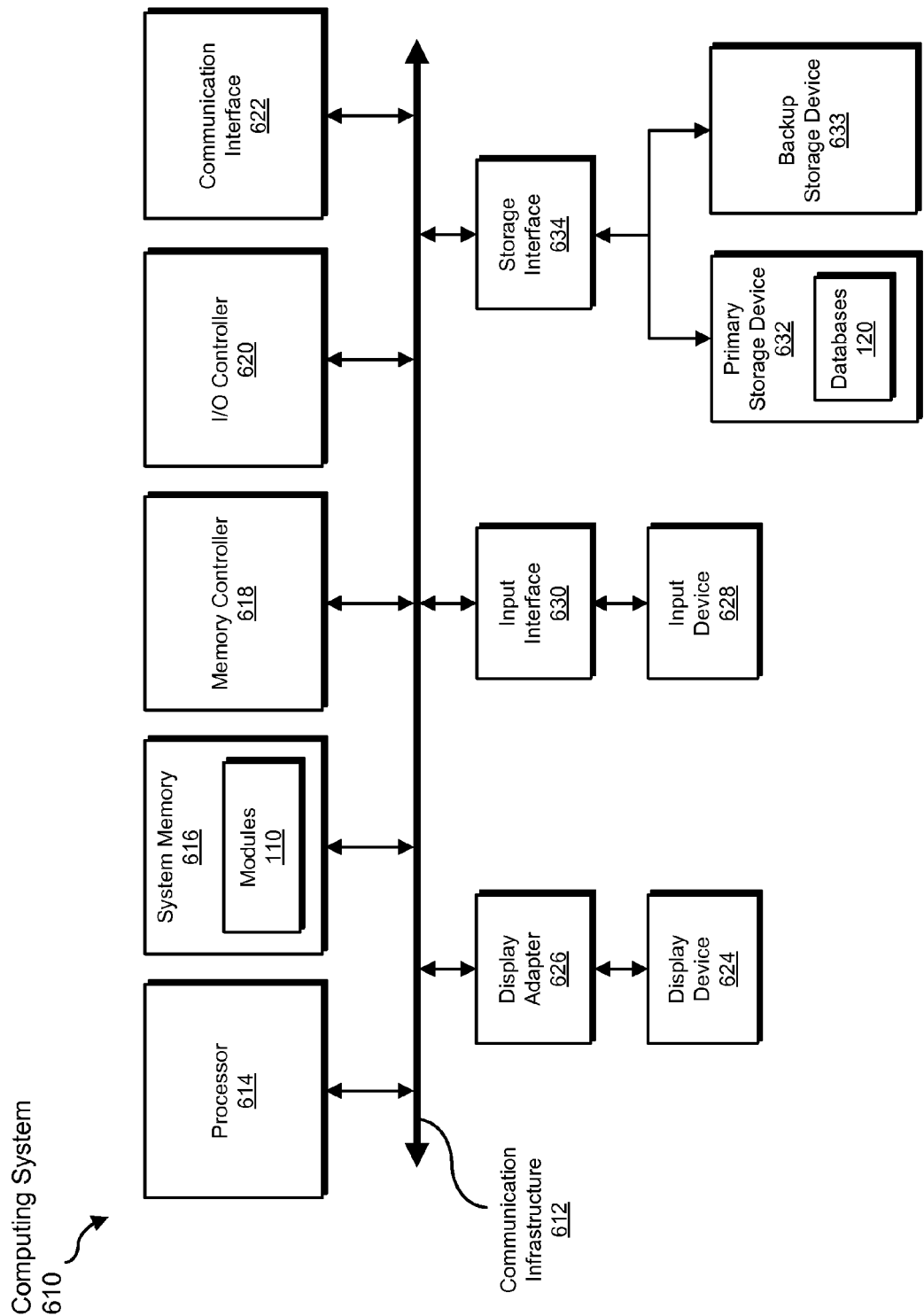
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the sharing, determining, monitoring, creating, providing, receiving, storing, identifying, using, extracting, associating, and/or formatting steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory ("RAM"), read only memory ("ROM"), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 110 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output ("I/O") controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller may perform and/or be a means for performing, either alone or in combination with other elements, one or more of the steps or features described and/or illustrated herein, such as sharing, determining, monitoring, creating, providing, receiving, storing, identifying, using, extracting, associating, and/or formatting.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the sharing, determining, monitoring, creating, providing, receiving, storing, identifying, using, extracting, associating, and/or formatting steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 694 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the sharing, determining, monitoring, creating, providing, receiving, storing, identifying, using, extracting, associating, and/or formatting steps disclosed herein. Communication interface 622 may also be used to perform and/or be a means for performing other steps and features set forth in the instant disclosure.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the sharing, determining, monitoring, creating, providing, receiving, storing, identifying, using, extracting, associating, and/or formatting steps disclosed herein. Input device 628 may also be used to perform and/or be a means for performing other steps and features set forth in the instant disclosure.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610. In one example, databases 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, storage devices 632 and 633 may be used, for example, to perform and/or be a means for performing, either alone or in combination with other elements, one or more of the sharing, determining, monitoring, creating, providing, receiving, storing, identifying, using, extracting, associating, and/or formatting steps disclosed herein.

Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit ("ASIC") adapted to implement one or more of the exemplary embodiments disclosed herein.

Figure 7:
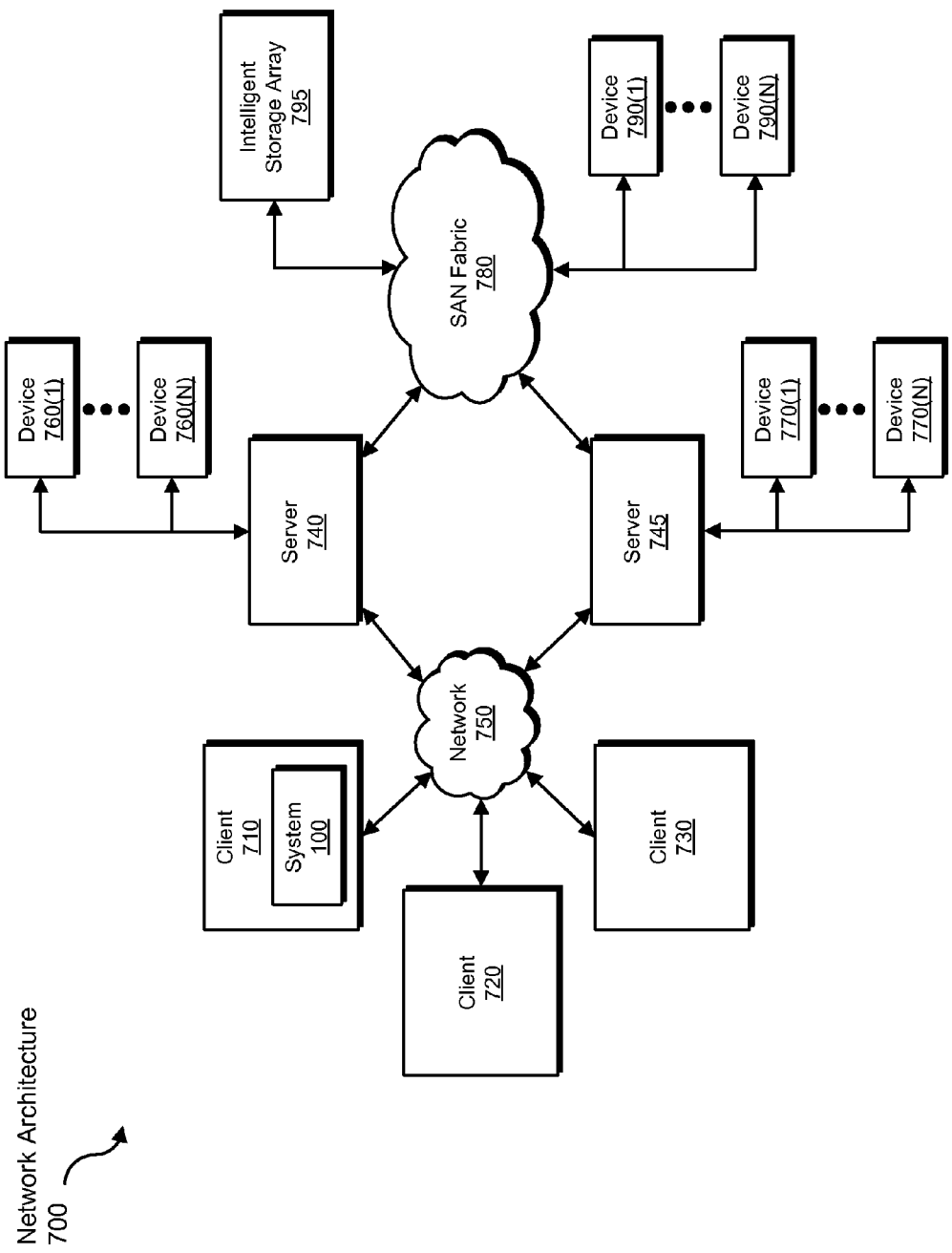
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. In one example, client system 710 may include all or a portion of system 100 from FIG. 1.

Similarly, servers 740 and 745 generally represent computing devices or systems, such as application servers or database servers, configured to provide various database services and/or run certain software applications. Network 750 generally represents any telecommunication or computer network including, for example, an intranet, a wide area network ("WAN"), a local area network ("LAN"), a personal area network ("PAN"), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage ("NAS") devices configured to communicate with servers 740 and 745 using various protocols, such as NFS, SMB, or CIFS.

Servers 740 and 745 may also be connected to a storage area network ("SAN") fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the sharing, determining, monitoring, creating, providing, receiving, storing, identifying, using, extracting, associating, and/or formatting steps disclosed herein. Network architecture 700 may also be used to perform and/or be a means for performing other steps and features set forth in the instant disclosure.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

One or more of the software modules described herein may transform data, physical devices, and/or representations of physical devices from one form to another. For example, monitoring module 114 may transform the state of a data storage device by storing an activity log to the data storage device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for sharing logs, at least a portion of the method being performed by a computing system comprising at least one processor, the method comprising:
   receiving a request, from a requesting guardian of a child, to create a log-sharing policy that authorizes the requesting guardian of the child to view logs of computer activity of the child performed on a tracking computing device that is controlled by a tracking guardian of a different child and that is not controlled by the requesting guardian, the log-sharing policy indicating circumstances in which logs of computer activity on the tracking computing device are allowed to be provided to the requesting guardian;
   notifying the tracking guardian of the request to create the log-sharing policy;
   receiving, from the tracking guardian, a response that authorizes the requesting guardian to view the logs of the computer activity of the child performed on the tracking computing device;
   in response to receiving the authorization from the tracking guardian, storing the log-sharing policy;
   determining that the child is involved in a computer activity on the tracking computing device;
   monitoring the computer activity by a parental control software system at the tracking computing device;
   creating a log of the computer activity;
   determining, based on the log-sharing policy, that the requesting guardian is authorized to view the log of the computer activity, the tracking guardian being required to agree to share the log of the computer activity by granting the request from the requesting guardian in order to share the log;
   providing the log of the computer activity to the requesting guardian at least in part by formatting the log in a format readable by a parental control software system different than the parental control software system on the tracking computing device.

2. The computer-implemented method of claim 1, wherein receiving the request to create the log-sharing policy comprises receiving a request to view logs of computer activity that occurs on the tracking computing device during a period of time specified by the request to view the logs of the computer activity.

3. The computer-implemented method of claim 1, wherein receiving the request to create the log-sharing policy comprises receiving a request to view the logs of the computer activity in a specified format.

4. The computer-implemented method of claim 1, wherein providing the log of the computer activity to the requesting guardian comprises:
   identifying a set of logs that comprises the log of the child's computer activity;
   using the log-sharing policy to identify the log of the child's computer activity within the set of logs;
   extracting the log of the child's computer activity from the set of logs.

5. The computer-implemented method of claim 1, wherein the log-sharing policy:
   identifies an online account of the child;
   indicates that the requesting guardian is authorized to view logs of computer activity associated with the online account of the child.

6. The computer-implemented method of claim 1, wherein the log-sharing policy:
   identifies a time period;
   indicates that the requesting guardian is authorized to view logs of computer activity that occurs during the time period.

7. The computer-implemented method of claim 1, wherein determining that the child is involved in the computer activity comprises determining that the child is in proximity of the tracking computing device.

8. The computer-implemented method of claim 7, wherein:
   determining that the child is in proximity of the tracking computing device comprises:
      identifying a person in proximity of the tracking computing device;
      determining, after creating the log, that the person in proximity of the tracking computing device is the child;
   monitoring the computer activity comprises associating the child with the log of the child's computer activity after determining that the person in proximity of the tracking computing device is the child.

9. The computer-implemented method of claim 8, wherein determining that the person in proximity of the tracking computing device is the child comprises at least one of:
   using face-recognition technology to identify the child;
   using speaker-recognition technology to identify the child.

10. The computer-implemented method of claim 1, wherein the parental control software system is a cloud-based system located accessible to the tracking computing device and a second computing device via a cloud computing environment.

11. The computer-implemented method of claim 8, wherein determining that the person in proximity of the tracking computing device is the child comprises using radio-frequency-identification technology to identify the child.

12. The computer-implemented method of claim 1, further comprising requiring the requesting guardian to provide information that enables determining that the child is involved in the computer activity on the tracking computing device.

13. The computer-implemented method of claim 1, wherein monitoring the computer activity is performed before determining that a person who is involved in the computer activity is the child.

14. The computer-implemented method of claim 1, wherein receiving the request to create the log-sharing policy comprises:
   providing the requesting guardian with a list of logs of computer activities;
   receiving a request from the requesting guardian to view one or more logs from the list of logs provided to the requesting guardian.

15. A system for sharing logs, the system comprising:
   an identification module programmed to:
      receive a request, from a requesting guardian of a child, to create a log-sharing policy that authorizes the requesting guardian of the child to view logs of computer activity of the child performed on a tracking computing device that is controlled by a tracking guardian of a different child and that is not controlled by the requesting guardian, the log-sharing policy indicating circumstances in which logs of computer activity on the tracking computing device are allowed to be provided to the requesting guardian;
      notify the tracking guardian of the request to create the log-sharing policy;
      receive, from the tracking guardian, a response that authorizes the requesting guardian to view the logs of the computer activity of the child performed on the tracking computing device;
      in response to receiving the authorization from the tracking guardian, store the log-sharing policy;
      determine that the child is involved in a computer activity on the tracking computing device;
   a monitoring module programmed to:
      monitor the computer activity through a parental control software system at the tracking computing device;
      create a log of the computer activity;
   one or more databases configured to:
      store the log of the computer activity;
      store the log-sharing policy;
   a log-sharing module in communication with the one or more databases and programmed to:
      identify the log-sharing policy;
      determine, based on the log-sharing policy, that the requesting guardian is authorized to view the log of the computer activity, the tracking guardian being required to agree to share the log of the computer activity by granting the request from the requesting guardian in order to share the log;
      provide the log of the computer activity to the requesting guardian at least in part by formatting the log in a format readable by a parental control software system different than the parental control software system on the tracking computing device;
   one or more processors configured to execute the identification module, the monitoring module, and the log-sharing module.

16. The system of claim 15, wherein the log-sharing module is programmed to provide the log of the computer activity to the requesting guardian by:
   identifying a set of logs that comprises the log of the child's computer activity;
   using the log-sharing policy to identify the log of the child's computer activity within the set of logs;
   extracting the log of the child's computer activity from the set of logs.

17. The system of claim 15, wherein:
   the identification module is programmed to determine that the child is involved in the computer activity by determining that the child is in proximity of the tracking computing device;
   the monitoring module is programmed to monitor the computer activity by associating the child with the log of the child's computer activity.

18. The system of claim 17, further comprising an identification device in communication with the identification module and configured to determine that the child is in proximity of the tracking computing device by:
   identifying a person in proximity of the tracking computing device;
   determining that the person in proximity of the tracking computing device is the child.

19. The system of claim 18, wherein the identification device comprises at least one of:
   an audio-capturing device;
   a video-capturing device;
   an image-capturing device;
   a radio-frequency-identification receiver.

20. A non-transitory computer-readable-storage medium comprising one or more computer-executable instructions that, when executed by at least one processor of a tracking computing device, cause the tracking computing device to:
   receive a request, from a requesting guardian of a child, to create a log-sharing policy that authorizes the requesting guardian of the child to view logs of computer activity of the child performed on the tracking computing device that is controlled by a tracking guardian of a different child and that is not controlled by the requesting guardian, the log-sharing policy indicating circumstances in which logs of computer activity on the tracking computing device are allowed to be provided to the requesting guardian;
   notify the tracking guardian of the request to create the log-sharing policy;
   receive, from the tracking guardian, a response that authorizes the requesting guardian to view the logs of the computer activity of the child performed on the tracking computing device;
   in response to receiving the authorization from the tracking guardian, store the log-sharing policy;
   determine that the child is involved in a computer activity on the tracking computing device;
   monitor the computer activity by a parental control software system at the tracking computing device;
   create a log of the computer activity;
   determine, based on the log-sharing policy, that the requesting guardian is authorized to view the log of the computer activity, the tracking guardian being required to agree to share the log of the computer activity by granting the request from the requesting guardian in order to share the log;

provide the log of the computer activity to the requesting guardian at least in part by formatting the log in a format readable by a parental control software system different than the parental control software system on the tracking computing device.

* * * * *